United States Patent
Taylor et al.

(10) Patent No.: US 8,799,927 B1
(45) Date of Patent: Aug. 5, 2014

(54) TECHNIQUES FOR USE WITH REPETITIVE EVENT OCCURRENCES

(75) Inventors: Alan L. Taylor, Cary, NC (US); Robert F. Goudreau, Jr., Cary, NC (US); Mayank Ajmera, Morrisville, NC (US)

(73) Assignee: EMC Corporation, Hopkinton, MA (US)

( * ) Notice: Subject to any disclaimer, the term of this patent is extended or adjusted under 35 U.S.C. 154(b) by 160 days.

(21) Appl. No.: 13/421,227

(22) Filed: Mar. 15, 2012

(51) Int. Cl.
*G06F 3/00* (2006.01)

(52) U.S. Cl.
USPC .......................... 719/318; 719/328; 719/311

(58) Field of Classification Search
CPC ............ G06F 17/3087; G06F 11/3636; G06F 11/323; G06F 17/30867; G06F 11/3466; G06F 11/3664; G06F 2201/86; G06F 9/4443
See application file for complete search history.

(56) References Cited

U.S. PATENT DOCUMENTS

| | | | | |
|---|---|---|---|---|
| 6,363,435 | B1 * | 3/2002 | Fernando et al. | 719/318 |
| 7,546,607 | B2 * | 6/2009 | Demsey et al. | 719/318 |
| 8,516,499 | B2 * | 8/2013 | Akiyama et al. | 719/313 |
| 2005/0138111 | A1 * | 6/2005 | Aton et al. | 709/201 |
| 2005/0246716 | A1 * | 11/2005 | Smith et al. | 719/315 |
| 2007/0030853 | A1 * | 2/2007 | Rogers et al. | 370/395.21 |
| 2009/0320046 | A1 | 12/2009 | Laverone et al. | |
| 2010/0162269 | A1 * | 6/2010 | Lucas et al. | 719/318 |

OTHER PUBLICATIONS

"Heuristic Methods for Automating Event Detection on Sensor Data in Near Real-Time", Mauer, 2011, pp. 1-8.*
"A Model for Event and Time Driven Service Oriented Archtecture", Sengupta, 2010, pp. 1-9.*
Zhang et al., "Techniques for Event Filtering", U.S. Appl. No. 12/924,571, filed Sep. 30, 2010.

* cited by examiner

*Primary Examiner* — Tuan Dao
(74) *Attorney, Agent, or Firm* — Muirhead and Saturnelli, LLC

(57) ABSTRACT

Described are techniques for determining noteworthy events. A client performs a first call to a first routine having a first interface. The first interface includes a first set of input parameters specifying noteworthiness criteria indicating which event occurrences in a sequence of event occurrences are noteworthy. The client performs a second call to a second routine having a second interface to record an event occurrence of the sequence. The second routine perform processing returning information to the client including an indicator value denoting whether the event occurrence is noteworthy. In response to receiving the indicator value, the client may perform an action if the indicator value denotes that the event occurrence is noteworthy.

20 Claims, 10 Drawing Sheets

TECHNIQUES FOR USE WITH REPETITIVE EVENT OCCURRENCES

BACKGROUND

1. Technical Field

This application relates to techniques used in connection with event occurrences, and more particularly in connection with determining noteworthy or significant event occurrences.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, events may repetitively occur. If such events occur at a high rate, a system may utilize an undesirable amount of resources processing these event occurrences. Thus, there may be an adverse affect on the ability of the system to have sufficient resources remaining to perform other more typical processing. Such a constant stream of event occurrences may be commonly referred to as an indication storm. The adverse consequences may include, for example, the users of the system experiencing delays in connection with performing other operations while the system is processing the constant stream of event occurrences. Another possible adverse consequence is that reporting on such a constant stream of repeated event occurrences may hinder the ability to diagnose a problem in different ways. For example, since most of the messages regarding event occurrences are those of the constant stream, such messages may obscure an occurrence of any other more important event, or such messages may consume an undesirable amount of a finite resource, such as a buffer, where such messages may be recorded thereby causing possible loss of other more important messages once the finite resource is exhausted.

SUMMARY OF THE INVENTION

In accordance with one aspect of the invention is a method for determining noteworthy events comprising: performing, by a client, a first call to a first routine having a first interface, said first interface including a first set of one or more input parameters specifying noteworthiness criteria indicating which event occurrences in a sequence of event occurrences are noteworthy, said first routine initializing state information for the sequence of event occurrences, said state information including a counter denoting a number of recorded event occurrences in the sequence at a current point in time; performing, by the client, a second call to a second routine having a second interface to record an event occurrence of the sequence, said second routine performing first processing for said event occurrence including: updating the state information for the sequence by incrementing the counter thereby recording that said event occurrence; determining, using said noteworthiness criteria, whether said event occurrence is noteworthy; and returning information to the client including an indicator value denoting whether said event occurrence is noteworthy; and determining, by the client in response to receiving said indicator value for said event occurrence, whether said indicator value indicates that said event occurrence is noteworthy and wherein said client performs an action if said indicator value indicates that said event occurrence is noteworthy. The client may perform a plurality of calls to said second routine to record a plurality of event occurrences for the sequence, each of said plurality of calls resulting in said second routine recording one of said plurality of event occurrences in the sequence and returning an indicator value to the client indicating whether said one event occurrence just recorded is noteworthy in accordance with said noteworthiness criteria. Each event occurrence in the sequence may have a position in said sequence indicating when said each event occurrence is recorded relative to recording other event occurrences in the sequence. The noteworthiness criteria may specify a plurality of positions in the sequence corresponding to event occurrences in said sequence which are noteworthy. The noteworthiness criteria may include a first parameter indicating a quantity of initial noteworthy events in the sequence and a second parameter indicating an initial noteworthiness goal. The second parameter may denote an initial interval value used to identify a first position in the sequence subsequent to said initial noteworthy events whereby the first position denotes a next noteworthy event in the sequence following said initial noteworthy events. The noteworthiness criteria may include a third parameter identifying a growth factor denoting a multiplicative amount by which an interval denoting a next noteworthy event occurrence increases when said counter is updated to a value that identifies a position in said sequence that is greater than or equal to the first position and that corresponds to an event occurrence of the sequence that is noteworthy. The noteworthiness criteria may include a fourth parameter identifying a maximum value for the interval. The interval may have a first value denoting a first positional distance in the sequence of a first noteworthy event occurrence. Second processing may be performed to record a first event occurrence of the sequence. The second processing may include updating the counter to a first counter value denoting a position in the sequence for the first event occurrence; determining whether the counter is equal to the interval; and determining that the first event occurrence is the first noteworthy event occurrence if the counter is equal to the interval. If the first event occurrence is identified as the first noteworthy event occurrence in the sequence, third processing may be performed. The third processing may include determining a second value by multiplying the first value by the growth factor; determining whether the second value is greater than said maximum value; and updating the interval to the second value denoting a second positional distance in the sequence of a second noteworthy event occurrence subsequent in the sequence to said first noteworthy event if said second value is not greater than said maximum value, and otherwise, if said second value is greater than said maximum value, updating the interval to the maximum value. A third noteworthy event occurrence in the sequence subsequent to the second noteworthy event occurrence may have a third positional distance in the sequence that is a multiple of said maximum value and wherein an event occurrence being recorded may be determined as the third noteworthy event if the counter denoting the event occurrence being recorded is equal to the third positional distance. The second call to said second routine may return a count indicating a number of additional non-noteworthy event occurrences that have to be recorded prior to determining a next noteworthy event occurrence in the sequence. The method may further include performing, by the client, a third call to a third routine to reset the counter of the sequence to zero. Each call to the second routine to record an event occurrence of the sequence may return a current value of the counter denoting a position of the event occurrence recorded by said each call in the sequence. The first call to the first routine and the second call to the second routine may each identify an object as a parameter, wherein said object includes said state information for the sequence, and wherein the first routine and the second routine are methods of the object. The noteworthiness criteria may specify iterative count-based intervals whereby a next noteworthy event is determined based on a minimum number of event occurrences between the next noteworthy event in the sequence and the previous noteworthy event in the sequence. The noteworthiness criteria may specify time-based intervals whereby a next noteworthy event is determined based on a minimum amount of time having elapsed between the next noteworthy event in the sequence and the previous noteworthy event in the sequence. The noteworthiness may specify that a number of non-noteworthy events between successive noteworthy events increases by a multiplicative factor.

In accordance with another aspect of the invention is a computer readable medium comprising code stored thereon for determining noteworthy events, the computer readable medium comprising code for: performing, by a client, a first call to a first routine having a first interface, said first interface including a first set of one or more input parameters specifying noteworthiness criteria indicating which event occurrences in a sequence of event occurrences are noteworthy, said first routine initializing state information for the sequence of event occurrences, said state information including a counter denoting a number of recorded event occurrences in the sequence at a current point in time; performing, by the client, a second call to a second routine having a second interface to record an event occurrence of the sequence, said second routine performing first processing for said event occurrence including: updating the state information for the sequence by incrementing the counter thereby recording that said event occurrence; determining, using said noteworthiness criteria, whether said event occurrence is noteworthy; and returning information to the client including an indicator value denoting whether said event occurrence is noteworthy; and determining, by the client in response to receiving said indicator value for said event occurrence, whether said indicator value indicates that said event occurrence is noteworthy and wherein said client performs an action if said indicator value indicates that said event occurrence is noteworthy. The client may perform a plurality of calls to said second routine to record a plurality of event occurrences for the sequence. Each of the plurality of calls may result in said second routine recording one of said plurality of event occurrences in the sequence and may return an indicator value to the client indicating whether said one event occurrence just recorded is noteworthy in accordance with said noteworthiness criteria. Each event occurrence in said sequence may have a position in said sequence indicating when said each event occurrence is recorded relative to recording other event occurrences in the sequence. The noteworthiness criteria may specify a plurality of positions in the sequence corresponding to event occurrences in said sequence which are noteworthy. The noteworthiness criteria may include a first parameter indicating a quantity of initial noteworthy events in the sequence and a second parameter indicating an initial noteworthiness goal. The second parameter may denote an initial interval value used to identify a first position in the sequence subsequent to said initial noteworthy events whereby the first position denotes a next noteworthy event in the sequence following said initial noteworthy events.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
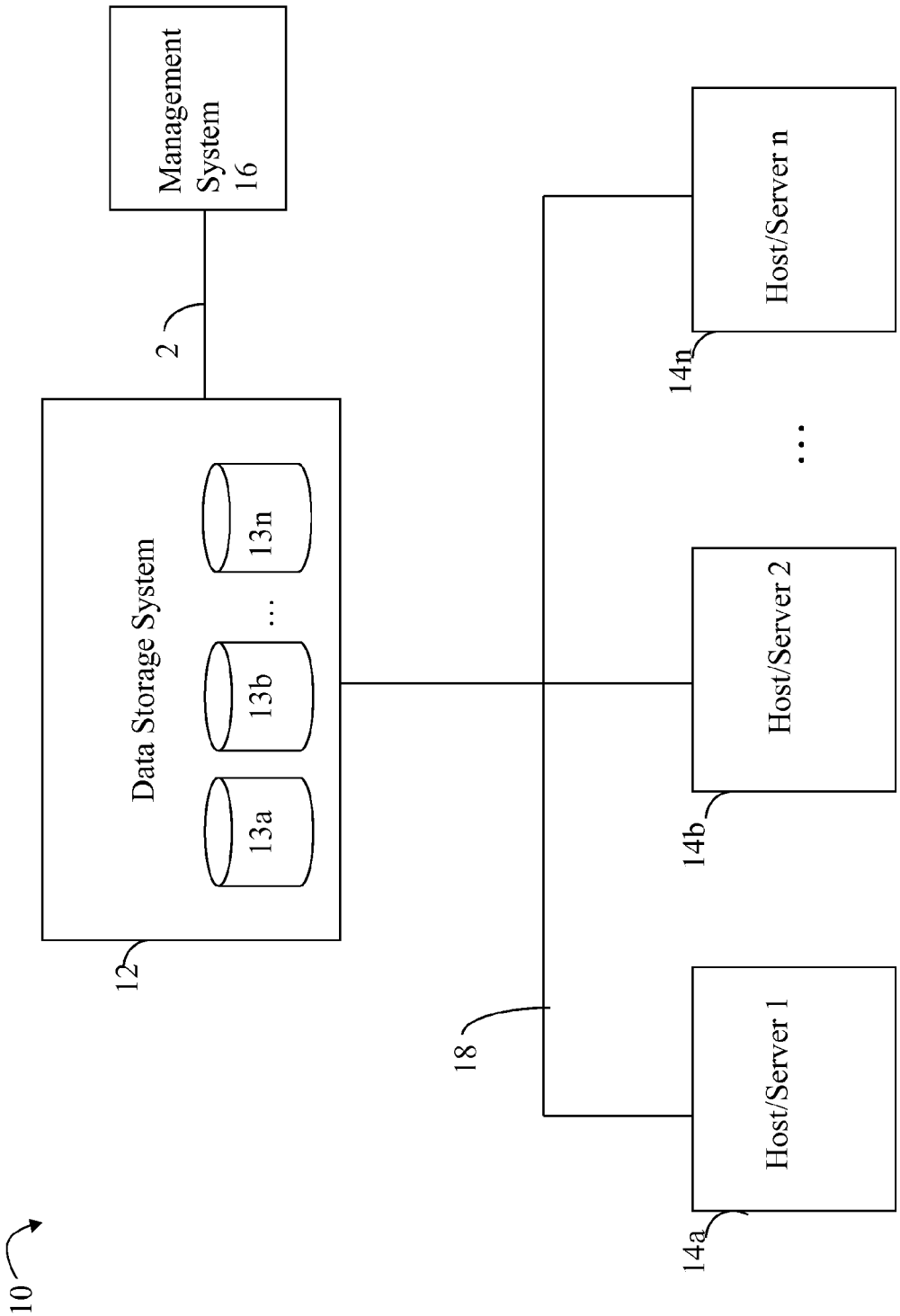
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices and/or switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
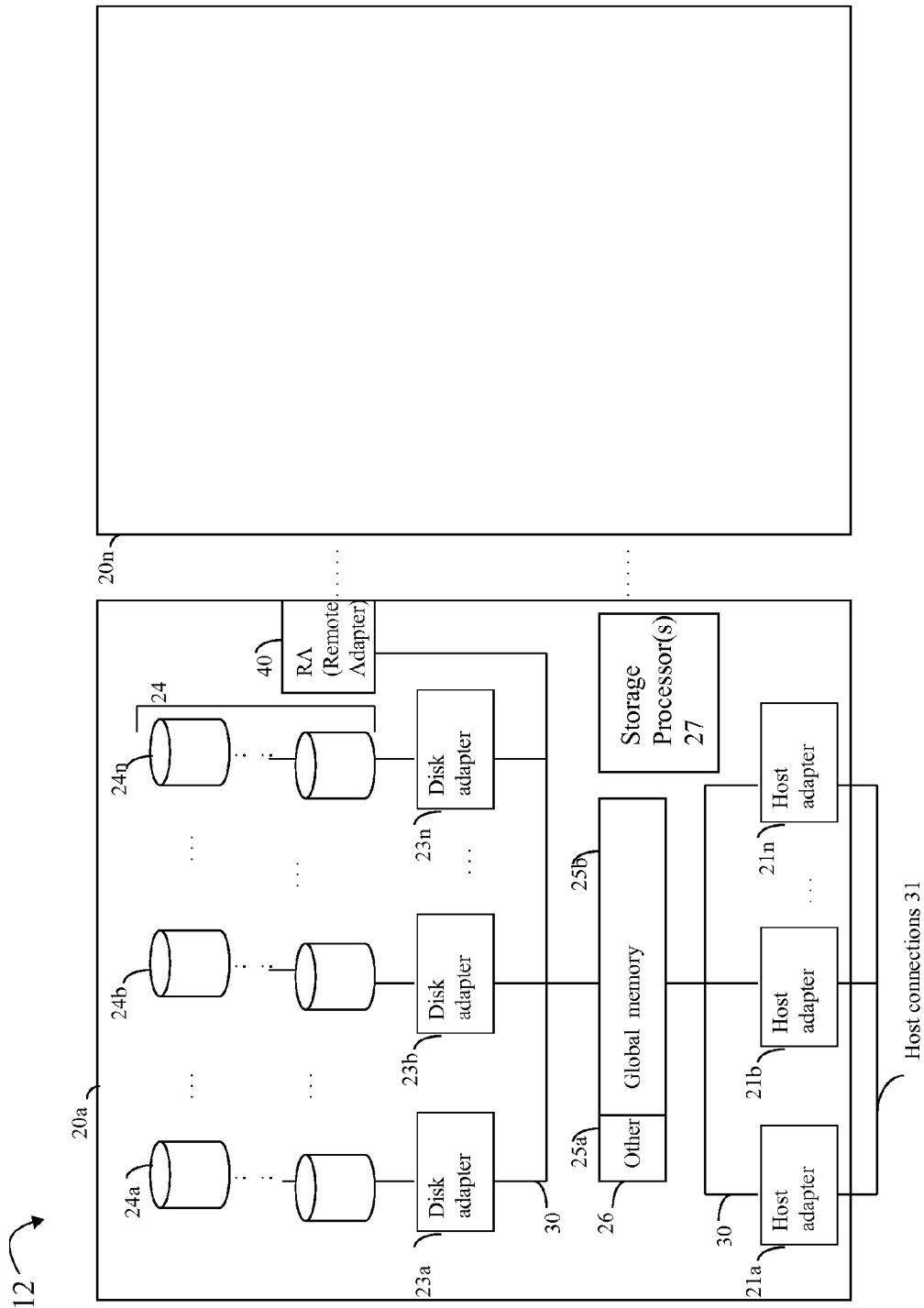
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs (remote adapters) and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

In connection with data storage systems, or more generally any type of system, events may repetitively occur. If such events occur at a high rate, a system may utilize an undesirable amount of resources processing these event occurrences so that there is an adverse affect on the ability of the system to have sufficient resources remaining to perform its other more typical processing. Such a constant stream of event occurrences may be commonly referred to as an indication storm. As a result, the users of the system may experience delays in connection with performing other operations while the system is processing the constant stream of event occurrences. Also, users of the system may not be able to track valuable information if the indication storm causes consumption of finite resources, such as a buffer or memory where event occurrences may be traced or recorded. Also, consumption of finite resources, such as a buffer or memory used to record all event occurrences for a repetitive error, may cause loss of other valuable information such as may be valuable to support analysts performing an investigation of events on a system.

Certain incidents or event occurrences may be important the first few times they occur, and may require special handling. However, subsequent consecutive event occurrences such as of the same event may grow progressively less important the more often they recur. Handling all repetitive occurrences of the same event equally may cause the overall system to deteriorate as actions intended for rare circumstances are performed with increasing frequency thereby often consuming an undesirable amount of one or more system resources such as, for example, CPU or computer processing time, memory or buffer space, and the like. Thus, there may be desire to differentiate between where a particular instance or occurrence of an event falls within the series or sequence of all such occurrences to provide for differential treatment of selected event occurrences in the repetitive sequence of event occurrences.

It should be noted that particular examples, systems, and the like, set forth in following paragraphs for purposes of illustration of the techniques herein should not be construed as a limitation of the more general and broad applicability of such techniques as will be appreciated by those skilled in the art.

As a first example illustrative of repetitive occurrences of the same event, consider a case where a system performs an action of tracing or logging occurrences of error conditions such for a logical device of the data storage system. The tracing or logging facility may have a fixed size buffer which includes information regarding, for example, the last traced N error conditions. The logged trace information on such error conditions may be valuable diagnostic information that may be used, for example, in debugging and in connection with system problem diagnosis and correction. However, a system, such as the above-mentioned logical device, may remain in an error state for a time period thereby resulting in a repetitive sequence of the same event occurrence being reported during the time period. It may be that a first occurrence of this event is important to note as it is indicative of an initial transition into this error state. However, subsequent repeated event occurrences of this same event may not be as important. In such a system, each of the repeated event occurrences may be logged in a fixed size buffer thereby unnecessarily consuming buffer resources with traces for those less important event occurrences after the initial occurrence. Thus, use of the trace buffer for storing less important event occurrences may prevent tracing or logging of other event messages should the buffer be entirely consumed.

As another example, consider retrying a failed operation as an action responsive to an event occurrence. Some failures reported as events may be due to transient error states (e.g, hardware and/or software performing preparatory processing to enter a particular state for performing an operation) and should be retried after an appropriate number of failures or amount of time. If the failure does not clear after, for example, a suitable amount of time has elapsed, after performing a number of attempts to attempt to retry the operation, it may be appropriate to cease retrying the operation to avoid consuming an excessive amount of CPU time and/or other resources and alternatively take some other course of action. Thus, it may be desirable to differentiate between different event occurrences for purposes of taking different responsive actions that may vary with the particular event occurrence (e.g., retry the operation a specified number of N times responsive to each of N event occurrences, after the Nth event occurrence, perform a different alternative action besides retrying the failed operation).

What will be described herein are techniques that may be used in connection with providing a solution to problems such as those described above. Techniques herein may be used to differentiate between different event occurrences in connection with a sequence of event occurrences such as, for example, where such sequence include repetitive occurrences of the same event. Techniques here provide for specifying noteworthiness criteria used to identify which one or more particular event occurrences in a sequence are noteworthy (e.g., important, of interest, significant) whereby other remaining even occurrences in the sequence may be deemed non-noteworthy (e.g., insignificant or not of interest). The techniques herein provide a general mechanism and architecture for determining event noteworthiness such as selectively determining noteworthy events using a logarithmic taper of the sequence of event occurrences. In some embodiments as described herein, the determination of event noteworthiness may be decoupled from performing an action responsive to noteworthy events. In this manner, an interface may be used in an embodiment such as described herein which provides for a first code module, such as a client, invoking other second code, such as of a library, providing services for determining when an event occurrence is noteworthy. The client may take a suitable responsive action based on whether a particular event occurrence is deemed noteworthy or non-noteworthy. The particular actions performed by the client may be transparent to the second code providing the noteworthy determination service. The second code providing the noteworthy service may be utilized by multiple different clients in connection with different streams of event occurrences. The interfaces described herein allow the client to specify a class or stream of incidents and various parameters which set forth the noteworthiness criteria or conditions regarding which occurrences the client considers noteworthy (e.g. the parameters specify the criteria used to determine what occurrences are noteworthy). In some embodiments, noteworthiness may be based on a number or quantity of event occurrences that have occurred to a point in time and also the particular position of the event occurrence in the sequence of event occurrences. At least a minimum number of event occurrences which are non-noteworthy may occur between subsequent consecutive noteworthy events. In some embodiments, noteworthiness may be based on a time interval such that at least a minimum amount of time has elapsed between subsequent consecutive noteworthy events with all other event occurrences there between being non-noteworthy. In embodiments where the distances or intervals in terms of position in the sequence between consecutive noteworthy events may be frequency or iteration-based on a number of occurrences, such distances may increase in an exponential or multiplicative manner as the sequence of event occurrences continues thereby providing for a logarithmic tapering regarding noteworthy event occurrences as the intervals or positional distances between such noteworthy event occurrences increases as the sequence progresses. In some embodiments, the noteworthiness criteria characterized as iteration-based may provide for identifying particular occurrences in the series as noteworthy without regard to (or independent of) the time interval lapsing between noteworthy event occurrences. In embodiments where distances or intervals between consecutive noteworthy events may be time-based (thereby requiring a minimum time separation between event occurrences deemed noteworthy), such distances may increase in an exponential or multiplicative manner as the sequence of event occurrences continues thereby providing for a logarithmic tapering regarding noteworthy event occurrences as the of intervals or time-based distances between noteworthy event occurrences increases as the sequence progresses.

As described elsewhere herein in more detail such as with a frequency-based determination of noteworthiness (e.g., noteworthiness determination based on position in the sequence of event occurrences), noteworthiness criteria may include, for example, a number "N" specifying that the first initial N event occurrences in the sequence are noteworthy (e.g. unfiltered), an initial noteworthiness goal (e.g., whereby the initial noteworthiness goal may identify a position X in the sequence where all events after the first initial event occurrences and prior to the position X in the sequence are non-noteworthy with event occurrence at position X in the sequence being noteworthy), a growth factor, and a maximum interval, MAX. Each position $X_i$ that is subsequent to position X denotes a next noteworthy event and $X_i$ is determined as the product of $X_{i-1}$ * growth factor. Additionally, any such $X_i$ does not exceed MAX. In determining a next successive noteworthy event at position $X_i$, if $X_i$ exceeds MAX, then the next successive noteworthy event in the sequence may be determined at position MAX in the sequence. Subsequent to position MAX in the sequence, a next noteworthy event may be determined as a next multiple of MAX.

In connection with techniques herein, interfaces may be defined which are used by a caller, or client, of services as may be provided by code of a library whereby the interfaces are defined interfaces of routines, functions, and the like, included in the library. An embodiment may define three interfaces for use by the client. The description in following paragraphs may refer to an object-based implementation which, as will be appreciated by one skilled in the art, may be easily adapted for use in connection with other variations such as non-object-based.

A first interface may be defined for a first routine that initializes a noteworthiness object. With this first interface, the caller specifies noteworthiness criteria as arguments or input parameters and identifies a noteworthiness object. The object may be associated with a particular sequence of event occurrences and may be used to track and maintain state information regarding the particular sequence such as, for example, a current position in the sequence of event occurrences as indicated by a counter. The invoked routine may initialize the object's incident counter to zero.

A second interface may be defined for a second routine that records an event occurrence for a sequence. The second routine may include parameters which identify a previously initialized noteworthiness object. The second routine may record the event occurrence by incrementing the object's incident counter. The second routine may perform processing determine whether the current event occurrence being recorded as denoted by the value of the counter is a noteworthy event. The current value of the counter may denote an index or position in the sequence for the event occurrence being recorded. The second routine may track and determine a position in the sequence corresponding to the next noteworthy event. The second routine may determine whether the event occurrence being recorded is the next noteworthy event by comparing the current value of the counter to the position in the sequence corresponding to the next noteworthy event. If the two values are the same, then the event occurrence may be deemed noteworthy. Otherwise, the event occurrence may be deemed non-noteworthy. The second routine may return to caller a flag indicating whether the event occurrence being recorded qualifies as noteworthy and a count of how many additional non-noteworthy incidents must be recorded until the next event occurrence is deemed noteworthy. Using this second routine and interface, the caller may take an appropriate action once the caller receives the returned information from the second routine indicating whether an event occurrence qualified as noteworthy. Additionally, the second routine may return a value denoting the position in the sequence of the event occurrence just recorded by the invocation of the second routine.

A third interface may be defined for a third routine to reset a noteworthiness object. The third routine may take an argument or input parameter identifying a previously initialized noteworthiness object. The third routine may reset or initialize the object's incident counter to zero (0).

Using such an interface in an embodiment in accordance with techniques herein, it is the caller, or client's, responsibility to call the above-mentioned second routine to record each new incident or event occurrence. In return, the client receives information indicating whether that particular iteration or event occurrence is noteworthy. As also described above, the second routine may return to the client a value identifying how many more occurrences needed to be recorded or occur in the sequence before the next noteworthy level (e.g., position in the sequence denoting a noteworthy event) is reached. This latter information may be important or useful to the client, for example, for reporting purposes. Using the above-mentioned first routine for initialization provides for flexibility in connection with the wide variety of noteworthiness criteria that may be specified by the client. For example, the client may specify values for the parameters defining a logarithmic nature of decay for noteworthiness events in the sequence by providing an appropriate multiplicative factor causing the noteworthiness to taper or tail off as the sequence progresses. In this manner, frequency of indicating events as noteworthy may decrease in a geometric or logarithmic manner. Alternatively, the client may specify other values for the multiplicative factor which do not denote such a logarithmic decay.

In an embodiment using such interfaces, the client may not track and maintain state information regarding whether a particular incident occurrence or iteration is noteworthy based on noteworthiness criteria but rather such state information may be included in the noteworthiness object associated with the sequence of event occurrences where such state in the object may be maintained by code of the above-mentioned first, second and third routines. The object may characterized in one aspect as maintaining state information describing a history regarding the stream of event occurrences.

Figure 3:
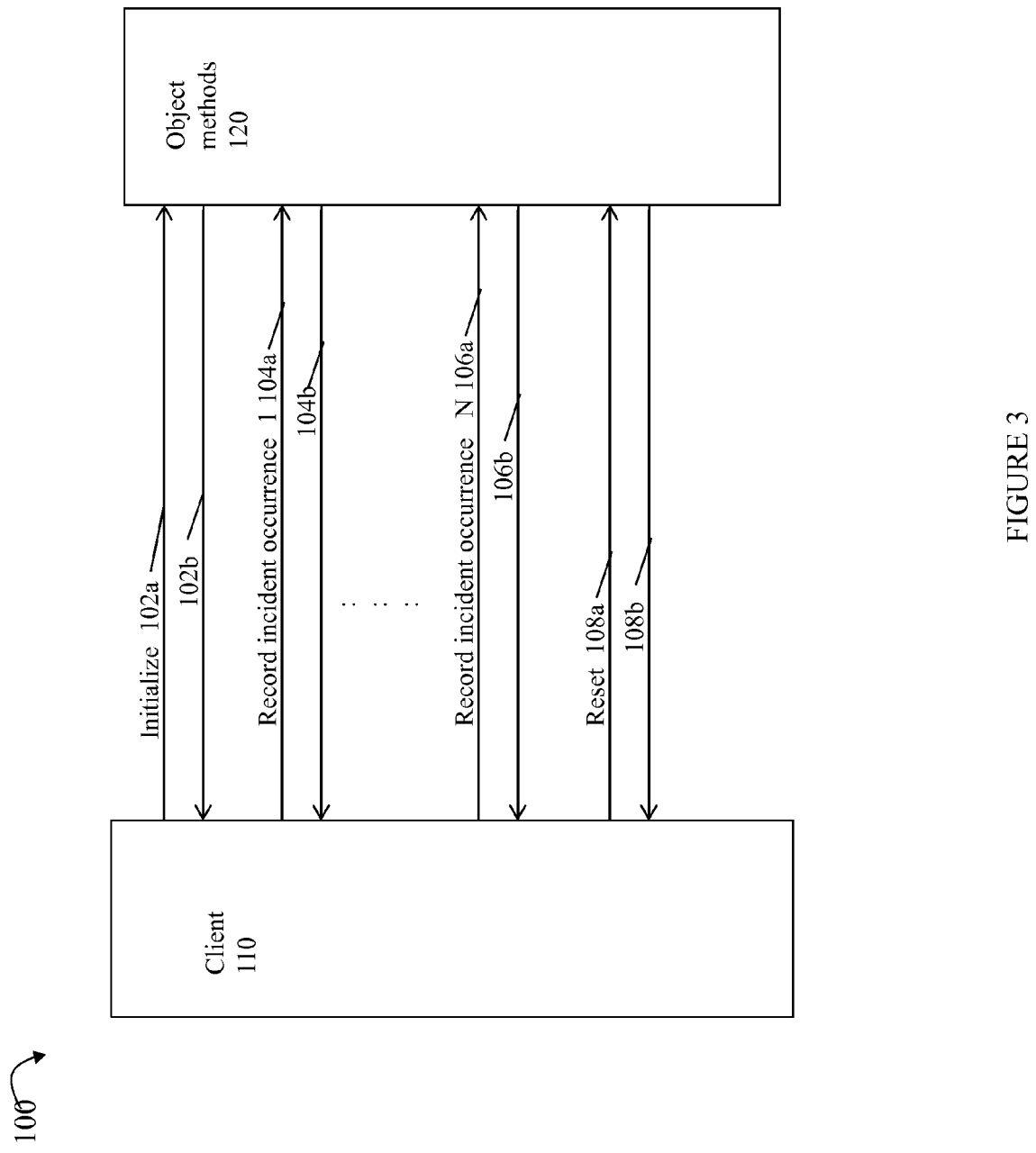
FIG. 3 is an example illustrating calls as may be made by a client to other code providing noteworthiness services in an embodiment in accordance with techniques herein.

Referring to FIG. 3, shown is an example 100 illustrating methods calls that may be made by a client 110 to object methods 120 providing the noteworthy services in an embodiment in accordance with techniques herein. It should be noted that the example 100 provides an illustration with reference to object methods performing services in connection with event noteworthiness for a client 110 based upon the above-mentioned three routines and associated interfaces. As will be described in more detail below, the techniques herein may be implemented using object oriented techniques with a noteworthiness object and associated object methods. However, as will be appreciated by one skilled in the art, the techniques herein may be implemented in accordance with any suitable model and means. More generally, the object methods 120 may represent code of routines, functions and the like, such as may be included in a library of routines which may be invoked by a caller such as the client 110.

Associated with a single stream or series of event occurrences may be an object, referred to herein as a noteworthiness object, used to track state information regarding event occurrences for the client 110. The object methods 120 may provide services in connection with determining whether an event or incident occurrence is noteworthy. The object's methods 120 may be called by the client 110 in connection with utilizing the noteworthiness object services in accordance with techniques herein. The object methods 120 may, for example, perform processing to track and maintain state information regarding the history of recorded event occurrences and client-specified noteworthiness criteria in the object. The object methods 120 may use the foregoing object state information to determine whether a particular event occurrence is noteworthy based on the client-specified criteria. The client 110 may perform method calls corresponding the three routines such as described above and elsewhere herein.

In a first step, the client 110 performs a first method call to initialize 102 object state information with respect to a subsequent stream or series of event occurrences as will be reported for recordation in the object by the client. This first method call may be as described above in connection with the first routine to initialize 102a the noteworthiness object state information may include input parameters specifying the noteworthiness criteria, and the noteworthiness object associated with the client's stream of event occurrences. The noteworthiness criteria may be specified by one or more input parameters that are used by object methods 120 to determine what reported incident or event occurrences qualify as noteworthy. For example, such criteria may specify that noteworthy event occurrences include the first initial K reported occurrences every Mth occurrence after this initial K occurrences, and the like. As described in more detail below, the criteria may be specified in an embodiment using parameters in such a way as to provide for a logarithmic tapering of event noteworthiness. In this manner, the event occurrences which are considered noteworthy may be collectively much less than the number of recorded event occurrences should an event "storm" occur. Thus, in a series or stream of recurring incidents or events, there may be only certain instances in the series or stream of occurrences which are deemed "noteworthy" and thereby deemed sufficiently important or significant to merit further action. One embodiment may specify criteria used to identify which particular occurrences in this series of recorded event or incident occurrences are noteworthy. In this way, the client may perform desired actions in response to those event occurrences indicated as noteworthy and may choose not to perform such actions for those event occurrences not deemed noteworthy (e.g., deemed non-noteworthy) based on the criteria. The first method may return 102b the initialized noteworthy object as an output. It should be noted that the description set forth in connection with FIG. 3 provides a general overall flow of the method or functions calls that may be made by a client to code providing the event or incident noteworthiness services. Additional detail regarding the interface, such as regarding specification of the noteworthiness criteria, as may be used in an embodiment for such calls is provided in subsequent paragraphs.

After the noteworthiness object has been initialized, the client 110 may subsequently report multiple event occurrences for recording in the noteworthiness object. Element 104a illustrates a second object method call by the client to record an event or incident occurrence in the noteworthiness object where the second method may be similar to the second routine as described above and elsewhere herein. The noteworthiness object may be specified as an input parameter in the second method call. The second method may perform processing to update the noteworthiness object's state information for the incident occurrence being recorded with the current invocation of the second method. The second method may perform processing to determine whether the current incident occurrence is noteworthy or not. As an output, the second method call may return 104b a flag or other indicator indicating whether the current incident is noteworthy, or not. The second method call may also return other information such as, for example, a count indicating how many additional subsequent non-noteworthy events must be recorded prior to determining the next noteworthy event. The client may subsequently invoke the second method multiple times, once for each event or incident occurrence to record such occurrence in the noteworthiness object's state information. In the example 100, the client may invoke the object's second method N times whereby element 106a represent the Nth invocation of the second method to record the Nth incident occurrence in the noteworthiness object.

At some later point in time, the client 110 may desire to reset the noteworthiness object. In this case, the client 110 may perform a third method call to reset 108a the noteworthiness object specified as an input parameter. The third method may be similar to the third routine as described above and elsewhere herein. The third method may reset the object's state information, such as reset the noteworthiness object's incident or event counter to zero (0) whereby the counter now identifies the start of an event sequence. In this manner, the client 110 may again use the previously initialized noteworthiness object with the next recorded event occurrence being the first in the sequence. It should be noted that resetting the object's state may include resetting the incident or event counter so that the client 110 may now use the object and object methods to determine event or incident noteworthiness in accordance with the criteria included in a previous call to the first method to initialize the object. As described elsewhere herein, calling the third object method may also be performed, for example, as one of the actions that the client takes in response to determining that a particular event occurrence is noteworthy or upon the "Lth" occurrence of an event in the series (e.g., the client may choose to reset the object in response to reaching some maximum number of event occurrences where "L" may denote the position in the sequence of an occurrence recorded for a particular invocation of the second routine).

Figure 4A:
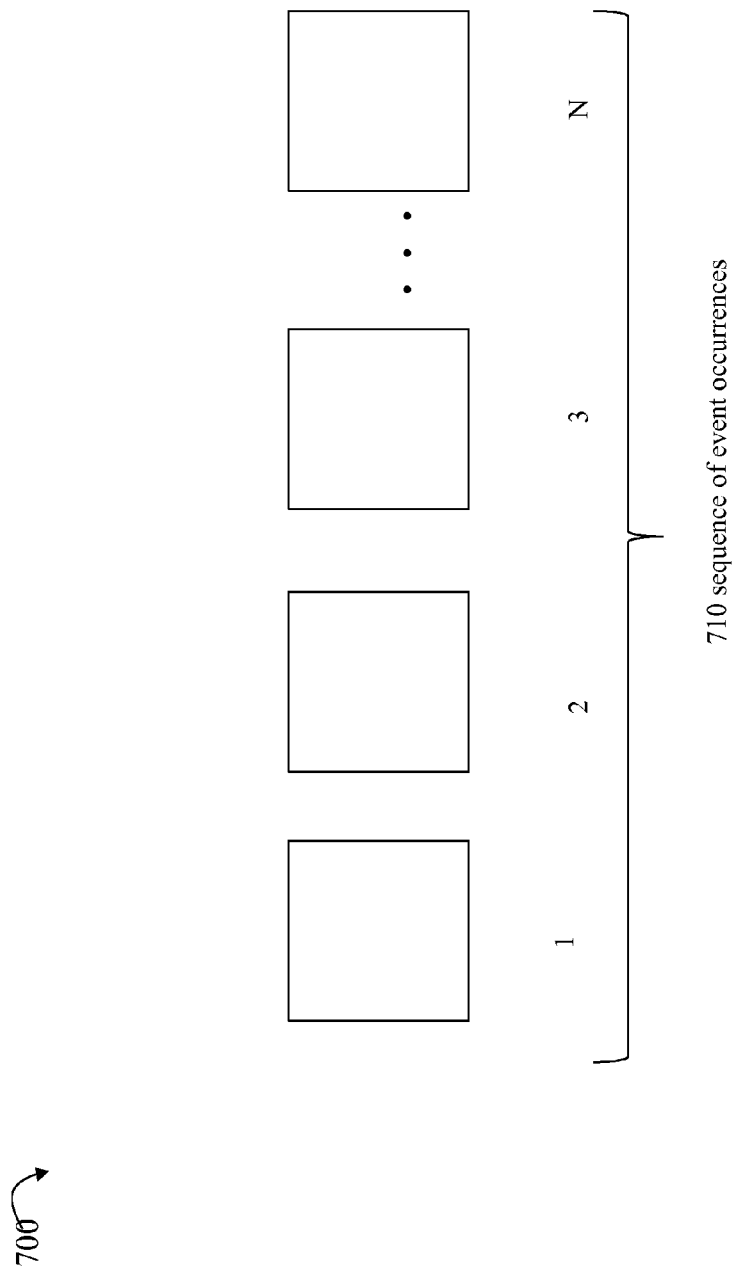
FIG. 4A is an example illustrating a sequence of event occurrences in an embodiment in accordance with techniques herein.

Referring to FIG. 4A, shown is an example illustrating a sequence of event occurrences as may be associated with a particular noteworthiness object in an embodiment in accordance with techniques herein. The object may store state information regarding the current sequence of event occurrences as described elsewhere herein. The example 700 denotes a sequence of event occurrences 710 where each event occurrence in the sequence may have an associated index or position in the sequence corresponding to relative ordering with respect to other event occurrences in the sequence with respect to time. A position j in the sequence associated with a first event occurrence may denote a relative ordering with respect to other event occurrences as to when the first event occurrence was recorded such as by invoking the second routine or method described above. As the event occurrence is recorded, the counter of the object for the stream may be incremented to indicate a next position in the sequence. Thus, each invocation of the second routine or method may denote recording a next one of the events in the sequence 710.

What will now be described as additional detail regarding the three routines or methods as may be included in an embodiment followed by an example illustrating use of the these methods.

Following is additional detail regarding the first method or routine, and associated interface, where the first method or routine initializes a noteworthiness object.

```
/// InitializeIncidentNoteworthiness
///
/// Initializes a noteworthiness object.
///
/// @param[in] pNoteworthiness
///     Client provides storage
/// @param[in] numInitialNoteworthyIncidents
///     The number of incidents since the object was initialized
///     or reset which will automatically be deemed noteworthy.
/// @param[in] initialModInterval
///     Additional incidents between <numInitialNoteworthyIncidents> and
///     this incident will be deemed non-noteworthy.
/// @param[in] modIntervalGrowth
///     The factor by which the mod interval grows each time it is
///     reached. The incident at which an interval is reached
///     is deemed noteworthy, and all subsequent incidents
///     until the next such interval are deemed non-noteworthy.
/// @param[in] maxModInterval
///     The maximum value that the mod interval may reach.
///
/// @retval void
///
void
InitializeIncidentNoteworthiness (
    IN OUT INCIDENT_NOTEWORTHINESS pNoteworthiness,
    IN ULONG64          numInitialNoteworthyIncidents,
    IN ULONG64          initialModInterval,
    IN ULONG64          modIntervalGrowth,
    IN ULONG64          maxModInterval
);
```

Following is additional detail regarding the second method or routine, and associated interface, where the second method or routine records a new event occurrence for a sequence.

```
///
/// RecordIncident
///
/// Records a new incident in a noteworthiness object and returns
/// information about that incident.
///
/// @param[in] pNoteworthiness
///     Address of a previously-initialized noteworthiness object.
/// @param[out] pIsNoteworthy
///     Address of a flag that will be set to TRUE if this particular
///     incident is noteworthy, else FALSE.
/// @param[out] pGapUntilNextNoteworthyIncident
///     Will be filled in with the number of additional non-noteworthy incidents
```

```
///     that must be recorded until one is deemed noteworthy.
///
/// @retval ULONG64
///     The instance number (since the last time the object
///     was reset) of the incident that was recorded.
///
ULONG64
RecordIncident (
    IN OUT INCIDENT_NOTEWORTHINESS pNoteworthiness,
    OUT PBOOLEAN        pIsNoteworthy,
    OUT PULONG64        pGapUntilNextNoteworthyIncident
);
```

Following is additional detail regarding the third method or routine, and associated interface, where the third method or routine resets a previously initialized noteworthiness object.

```
///
/// ResetIncidentNoteworthiness
///
/// Resets a noteworthiness object's incident counter to zero.
///
/// @param[in out] pNoteworthiness
///     Address of a previously-initialized noteworthiness object.
///
/// @retval void
///
void
ResetIncidentNoteworthiness (
    IN OUT INCIDENT_NOTEWORTHINESS pNoteworthiness
);
```

As an example, consider the following invocations of routines having the above-mentioned interfaces as may be used in an embodiment in accordance with techniques herein in connection with logical devices.

A sequence of event occurrences and a single noteworthiness object may be associated with a single logical device or volume. The sequence of event occurrences may be for a sequence of repeated occurrence of a single event for the logical device, such as a "device busy" error or status. The routine to initialize the noteworthiness object may be invoked when creating the logical device such as:

InitializeIncidentNoteworthiness(&mDeviceBusyIncidentNoteworthiness, 5, 10, 5, 1000);

In this invocation, the input parameters or arguments may denote noteworthiness criteria for this logical device and associated sequence of event occurrences as follows. The second parameter=5 denotes that the caller cares about the first 5 BUSYs and the first 5 occurrences of the "device busy" event are considered noteworthy. However, subsequent occurrences 6-9 of the device busy event are non-noteworthy (e.g., ignored by the caller) and the next noteworthy event occurrence is the $10^{th}$ incident of the "device busy" event (e.g., denoted by the third parameter=10). After the $10^{th}$ incident or occurrences, the caller is more selective in considering certain occurrences as noteworthy as indicated by the fourth parameter, the growth factor parameter=5, and the maximum value of 1000 denoted by the fifth parameter. Given this noteworthiness criteria, the following event occurrences in the sequence may be considered noteworthy: 1, 2, 3, 4, 5, 10, 50, 250, 1000, 2000, 3000, etc. (in continued increments of 1000).

The second routine to record incident occurrence may be included in code of a client as a caller, for example, when checking on the result of an IRP (I/O request packet) with data sent to the logical device or volume:

```
case mluLogicalVolumeFailIncomingIrpsWithBusyStatus: /* if there
is a Device busy status */
{
    Counter = RecordIncident(&mDeviceBusyIncidentNoteworthiness,
                &IsNoteworthy,
&GapUntilNext); /** record the current event occurrence **/
            /** examine returned information to determine an
                action to take */
    if (IsNoteworthy) /** if the event is noteworthy then trace or
        log the occurrence.
                non-noteworthy events are NOT logged or traced
                in this example */
    {
        IoTraceError((
            "LV::DispatchIoIrp: STATUS_DEVICE_BUSY result #I64d
            on device 0x%I64X;
Irp=%p\n",
            Counter, mMLUDeviceId, Irp));
/** output indication of next noteworthy event and number of subsequent
non-noteworthy event
not traced or logged. */
        if (0 != GapUntilNext)
        {
            IoTraceError((
                "LV::DispatchIoIrp: Will suppress tracing for
                next %I64d consecutive
            STATUS_DEVICE_BUSY results on device 0x%I64X\n",
                GapUntilNext, mMLUDeviceId));
        }
    }
}
```

Following is an example of the output that may be generated such as included in a trace buffer or log as a result of execution of the above-mentioned client code snippet when a device busy error or status is returned for the logical device such as may be returned when the client code checks on the result of a pending I/O request packet sent to the logical device. In this case, the client code may perform many such checks and receive many such device busy status returns.

LV::DispatchIoIrp: STATUS_DEVICE_BUSY result #1 on device 0xA000000E9; Irp=FFFF88008C0FD20

LV::DispatchIoIrp: STATUS_DEVICE_BUSY result #2 on device 0xA000000E9; Irp=FFFF88008C0D380

LV::DispatchIoIrp: STATUS_DEVICE_BUSY result #3 on device 0xA000000E9; Irp=FFFF88008C16C20

LV::DispatchIoIrp: STATUS_DEVICE_BUSY result #4 on device 0xA000000E9; Irp=FFFF88008C5DDE0

LV::DispatchIoIrp: STATUS_DEVICE_BUSY result #5 on device 0xA000000E9; Irp=FFFF88008C00D20

LV::DispatchIoIrp: Will suppress tracing for next 4 consecutive STATUS_DEVICE_BUSY results on device 0xA000000E9

LV::DispatchIoIrp: STATUS_DEVICE_BUSY result #10 on device 0xA000000E9; Irp=FFFF88008C00FD20

LV::DispatchIoIrp: Will suppress tracing for next 39 consecutive STATUS_DEVICE_BUSY results on device 0xA000000E9

LV::DispatchIoIrp: STATUS_DEVICE_BUSY result #50 on device 0xA000000E9; Irp=FFFF88008C00FD20

LV::DispatchIoIrp: Will suppress tracing for next 199 consecutive STATUS_DEVICE_BUSY results on device 0xA000000E9

LV::DispatchIoIrp: STATUS_DEVICE_BUSY result #250 on device 0xA000000E9; Irp=FFFF88008C00FD20

LV::DispatchIoIrp: Will suppress tracing for next 749 consecutive STATUS_DEVICE_BUSY results on device 0xA000000E9

LV::DispatchIoIrp: STATUS_DEVICE_BUSY result #1000 on device 0xA000000E9; Irp=FFFF88008C00FD20

LV::DispatchIoIrp: Will suppress tracing for next 999 consecutive STATUS_DEVICE_BUSY results on device 0xA000000E9

LV::DispatchIoIrp: STATUS_DEVICE_BUSY result #2000 on device 0xA000000E9; Irp=FFFF88008C00FD20
LV::DispatchIoIrp: Will suppress tracing for next 999 consecutive STATUS_DEVICE_BUSY results on device 0xA000000E9
LV::DispatchIoIrp: STATUS_DEVICE_BUSY result #3000 on device 0xA000000E9; Irp=FFFF88008C00FD20
LV::DispatchIoIrp: Will suppress tracing for next 999 consecutive STATUS_DEVICE_BUSY results on device 0xA000000E9

Figure 4B:
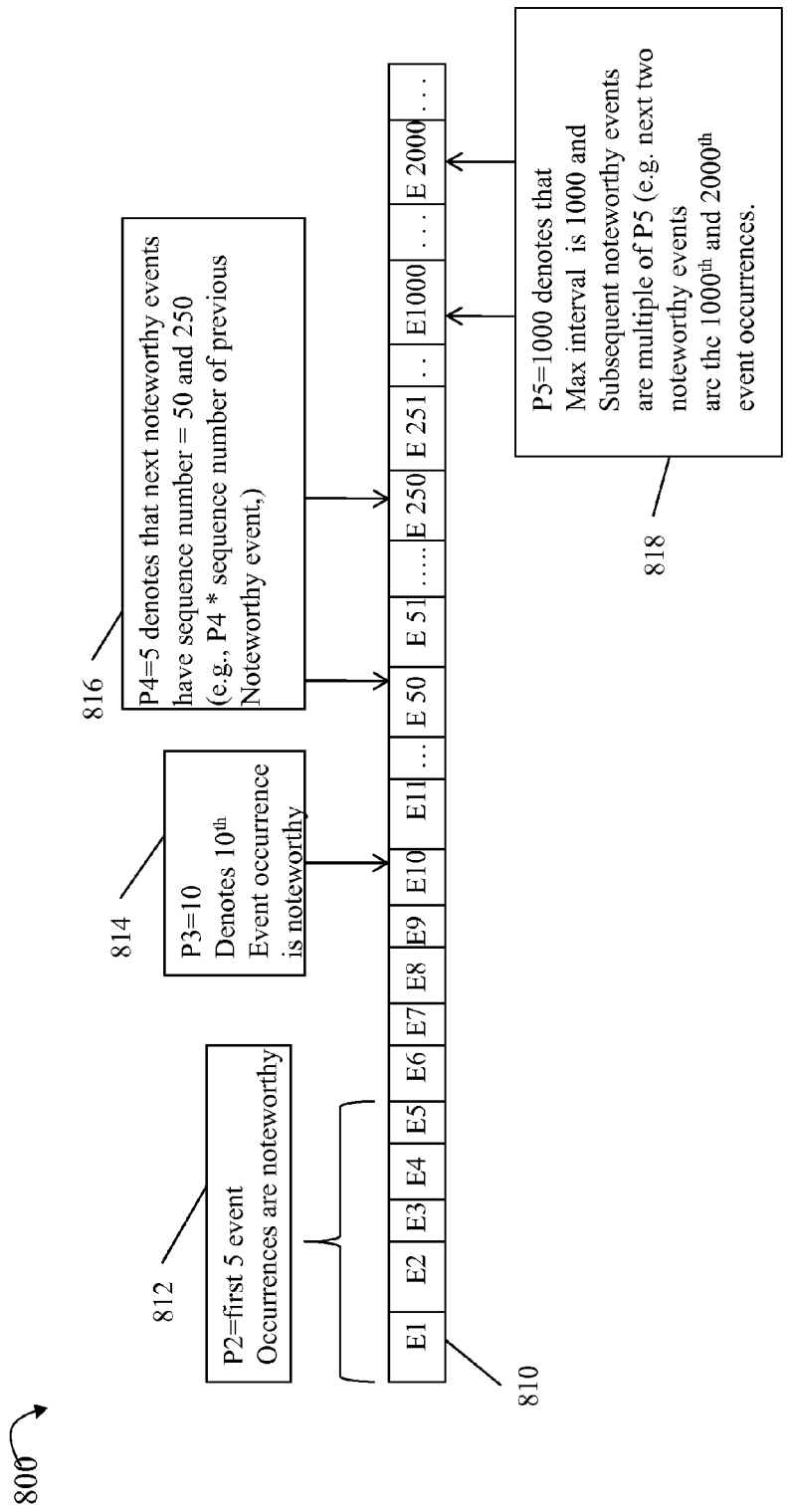
FIG. 4B is an example illustrating determination of noteworthy event occurrences in a sequence using iterative or frequency-based criteria in an embodiment in accordance with techniques herein.

The third routine to reset the noteworthiness object for the logical device may be included in code of a client as a caller, for example, when changing the logical device's IRP handler disposition:

ResetIncidentNoteworthiness(&mDeviceBusyIncidentNoteworthiness);

Referring to FIG. 4B, shown is an example illustrating the sequence of event occurrences as may be recorded in connection with the above-mentioned client code in an embodiment in accordance with techniques herein. The example 800 denotes a sequence of events 810 where each Ei denotes a recorded event occurrence in the sequence for the logical device above. Element 812, 814, 816 and 818 identify which event occurrences in the sequence are considered noteworthy based on the specified noteworthiness criteria in the above-mentioned invocation of the first routine to initialize the noteworthiness object (e.g., "InitializeIncidentNoteworthiness (&mDeviceBusyIncidentNoteworthiness, 5, 10, 5, 1000);"). In the example 800, Pj such as included in 812, 814, 816 and 818, denotes the jth parameter of this invocation of the first routine to initialize the noteworthiness object for the logical device's sequence of event occurrences.

An embodiment may also include an additional parameter that may be specified in the first routine to initialize the noteworthiness object. The additional parameter may specify a time period in selected time units, such as seconds, denoting a first timer value, T. If no noteworthy events (e.g., traced events in this example) have been received in the last previous T seconds, the counter associated with this object for the stream may be reset. Thus, the object's counter may be reset after an idle period denoted by T seconds.

An embodiment may also include a "minimum noteworthiness timer" specifying a second time value, such as T2, denoted a second timer value. T2 may denote a minimum time period. If there are any event occurrences during this time period T2 (whether deemed noteworthy or not in accordance with the sequence numbering or position and criteria), at least one of these event occurrences is logged or traced. In this manner, an embodiment may ensure that at least one event occurrence is logged at a minimum during the time period T2.

Figure 4C:
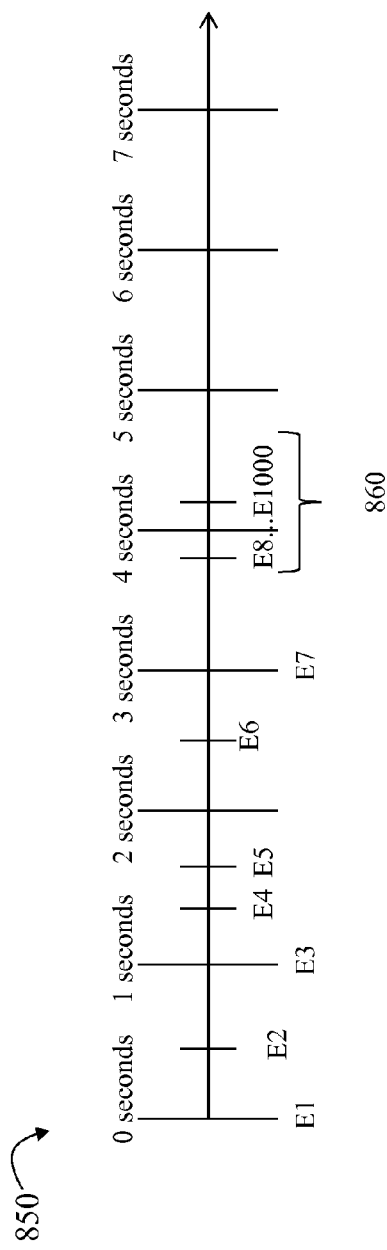
FIG. 4C is an example illustrating use of minimum noteworthiness timer in an embodiment in accordance with techniques herein.

Referring to FIG. 4C, shown is an example illustrating use of a "minimum noteworthiness timer in an embodiment in accordance with techniques herein. The example 850 includes a sequence of events E1, E2, etc., consistent with other figures herein, where each recorded event occurrence may be denoted on the illustrated time line. In this particular example, let event occurrences E1, E3 and E7 be considered noteworthy per existing noteworthiness criteria. Element 860 denotes that there may be many events (e.g. E8 through E1000) occurring at about the 4 second mark where such event occurrences may or may not be deemed noteworthy. However, using the "minimum noteworthiness timer" having a value of 1 second, it may be ensured that at least a single one of these events E8 through E1000 occurring within 1 second of the last noteworthy event E7 (e.g., at or before the 4 second mark) will be traced or logged.

What will now be described are examples in connection with determining noteworthy events where the criteria may be characterized as time-based intervals between noteworthy event occurrences rather than iterative, quantity, or count-based intervals between noteworthy events.

Figure 5:
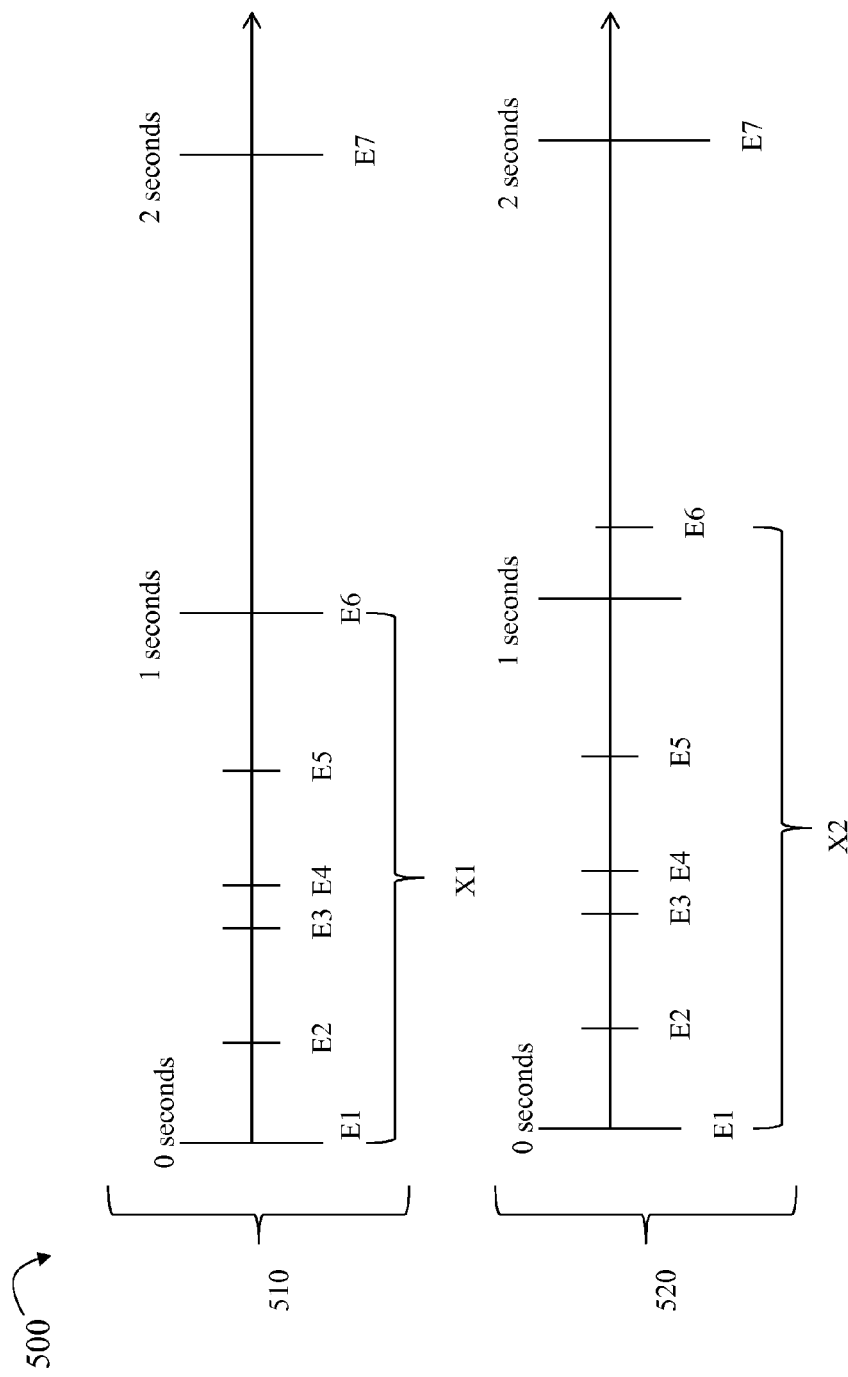
FIGS. 5 and 6 illustrate determination of noteworthy event occurrences in a sequence using time-based criteria in an embodiment in accordance with techniques herein.

Referring to FIG. 5, shown are examples 500 illustrating determination of noteworthy events using time-based intervals in an embodiment in accordance with techniques herein. For simplistic illustration, assume that the time interval between noteworthy events is 1 time unit such as 1 second. This time interval of 1 second may represent the minimum difference of elapsed time between a first noteworthy event and a second event for the second event to be deemed "noteworthy". With reference to element 510, shown is a timeline for a 2 second time period denoted as 0 to 2 seconds. Event occurrences reported by the client are denoted as E1-E6 as occurring at various points in time within the observed 2 second time interval represented in 510. E1 may denote a first noteworthy event and the next event that occurs 1 second or more from the time of event E1 may be deemed the next or second noteworthy event. In this example with reference to 510, the client may report on events E2, E3, E4 and E5. A timestamp value may be associated with event E1 and each of the events E2 through E5 subsequent to event E1. For each such recorded event E2-E6, processing may be performed to determine the amount of elapsed time between the subsequent event occurrence and the previous noteworthy event E1. For example, an amount of elapsed time between the occurrence of E2 and the previous noteworthy event E1 may be determined. This amount of elapsed time is not at least the specified time interval of 1 second thereby resulting in a determination that event E2 is not noteworthy. Similarly, processing may be performed for of the events E3-E5 when received and each of these events E3-E5 may be determined as not noteworthy. When the client reports on the occurrence of E6 for recording, an amount of elapsed time between the occurrence of E6 and the previous noteworthy event E1 may be determined. However, in this case, the amount of elapsed time between the occurrences of E6 and E1 (denoted as X1) is at least the specified time interval of 1 second thereby resulting in a determination that event E6 is noteworthy. Thus, using a time-based interval, it does not matter how many events occur prior to the minimum amount of time, as indicated by the noteworthy time interval, elapsing. Until at least the foregoing amount of time has elapsed, no recorded event is deemed noteworthy.

After the occurrence of event E6, assume that the second time interval used in determining the next noteworthy event is also 1 second. Event E7 may occur at the 2 second time interval and may be determined as the next noteworthy event since the amount of elapsed time between the occurrences of E6 (the previous noteworthy event) and E7 is at least the specified time interval of 1 second thereby resulting in a determination that event E7 is noteworthy.

With reference now to element 520, shown is another example of a timeline for a 2 second time period denoted as 0 to 2 seconds. The minimum time interval between noteworthy events may also be 1 second and the occurrences of the events E1-E6 are denoted on the timeline during the 2 second time period in a manner similar to that as in connection with 510 with the difference that event E6 occurs at a time of about 1.2 seconds subsequent to the previous noteworthy event E1. Element X2 denotes the foregoing amount of elapsed time of 1.2 seconds between the previous noteworthy event E1 and event E6. Since this amount of elapsed time (1.2 seconds) is greater than the minimum time interval of 1 second, then event E6 is deemed the next noteworthy event occurrence in the illustrated sequence or series of events E1-E6 with events E2-E5 being determined as not noteworthy as described above. In connection with both elements 510 and 520, it should be noted that the next noteworthy event determination begins with measuring the elapsed time with respect to the occurrence of event E6. With reference to 520, after the occurrence of event E6, assume that the second time interval used in determining the next noteworthy event is also 1 second. Event E7 may occur at the 2 second time interval and may not be determined as the next noteworthy event since the amount of elapsed time between the occurrences of E6 (the previous noteworthy event) and E7 is not at least the specified time interval of 1 second thereby resulting in a determination that event E7 is not noteworthy in connection with recorded events as in 520.

To more fully illustrate the use of time-based intervals for determining noteworthy events, consider the following as an exemplary API for initializing a noteworthy object in a manner similar to that as described elsewhere herein for quantity-based intervals or cumulative quantity of event occurrences.
InitializeIncidentNoteworthiness(
    IN OUT NOTEWORTHINESS_OBJECT PTR /* pointer to noteworthiness object*/,
    IN ULONG NUM_INIT /*number of initial time intervals since object was initialized or reset that will be 1 time unit */,
    IN ULONG Next_interval /* number of time units in the next time interval following the number of initial time intervals of 1 time unit as denoted by "NUM_INIT"*/,
    IN ULONG Interval_growth /* the growth factor by which the time interval increases each time a noteworthy event is determined based on the previous time interval. */,
    IN ULONG MAX_Interval /* the maximum value the time interval may reach */In the above, the first parameter "IN OUT NOTEWORTHINESS_OBJECT PTR" may denote a pointer to the noteworthiness object as an input parameter which is initialized. The object may be initialized by having its incident counter set to zero.

The second parameter "IN ULONG NUM_INIT" is an input parameter which may be an unsigned long integer denoting the number of initial time intervals since the object was initialized or reset that have a time unit of 1, such as 1 second, or some other time unit as may be used in an embodiment. It should be noted that the number of units in such initial time intervals may be 1 time unit, some other number of default time units, or may be specified as another parameter. For example, specifying 5 for the second parameter indicates that the each of the first 5 time intervals used in determining the next 5 noteworthy events will be 1 second each. The first recorded occurrence of an event (as reported by the client using this interface) may be the first noteworthy event occurrence. A determination of whether a subsequent event is noteworthy may be determined by measuring an elapsed time that has occurred between this first noteworthy event occurrence and the time of the subsequent event occurrence. The first time interval of 1 time unit, such as 1 second, may be the minimum amount of elapsed time or separation between the first and second noteworthy events. Similarly, the second time interval of 1 second may be the minimum amount of elapsed time or separation between the second and third noteworthy events.

It should be noted that an embodiment may have this second parameter alternatively denote a number of initial "unfiltered" event occurrences whereby the first "NUM_INIT" event occurrences are considered noteworthy. This is akin to using a time interval of zero (0) time units between noteworthy event occurrences when determining the first "NUM_INIT" noteworthy event occurrences in the sequence.

The third parameter "IN ULONG Next_interval" is an input parameter which may be an unsigned long integer denoting the number of time units of a "next time interval" whereby the "next time interval" is the next successive time interval ("NUM_NIT+1") immediately following the number of initial time intervals of 1 time unit as denoted by "NUM_INIT". For example assume a value of 5 for the second parameter and a value of 5 for the third parameter, "Next interval". In this case, "Next_interval"=5 denotes the number of time units in the $6^{th}$ time interval used in determining the 7th noteworthy event.

The fourth parameter "IN ULONG Interval_growth" is an input parameter that may be an unsigned long integer denoting the growth factor by which the time interval increases each time a noteworthy event is determined. The growth factor may be multiplied by the current time interval to obtain the next time interval used in determining the next noteworthy event. The fourth parameter is used in determining values of time intervals following the time intervals denoted by the second and third parameters. For example, assuming values as noted above for the second and third parameters, the fourth parameter may specify a growth factor of 5 whereby the $7^{th}$ time interval used to determine the $8^{th}$ noteworthy event may be 25, the $8^{th}$ time interval used to determine the $9^{th}$ noteworthy event may be 125, and so on subject to any further limits of other parameters.

The fifth parameter "1N ULONG MAX_Interval" may be an input parameter that is an unsigned long integer value denoting the maximum value the time interval may reach. For example, assume the fifth parameter has a value of 1000. Continuing with the above-referenced example with a growth factor of 5, the $9^{th}$ interval used to determine the $10^{th}$ noteworthy event may be 625 (e.g. 5*125). If we continue using the growth factor to determine the next time interval, the $10^{th}$ time interval would be 625 * 5=3125. However, this fifth parameter may be characterized as a maximum value of this time interval which is 1000. Thus, for the $10^{th}$ time interval and subsequent time intervals, a value of 1000 time units, such as 1000 seconds may be used.

It should be noted that the interface may include a RecordIncident interface with parameters and return values similar to that as described elsewhere herein for use with iterative or quantity-based noteworthiness determination with the different that the third parameter (e.g., OUT PULONG64 pGapUntilNextNoteworthyIncident) denotes the amount of time or number of time units in the next time interval used in determining the next noteworthy event.

Figure 6:
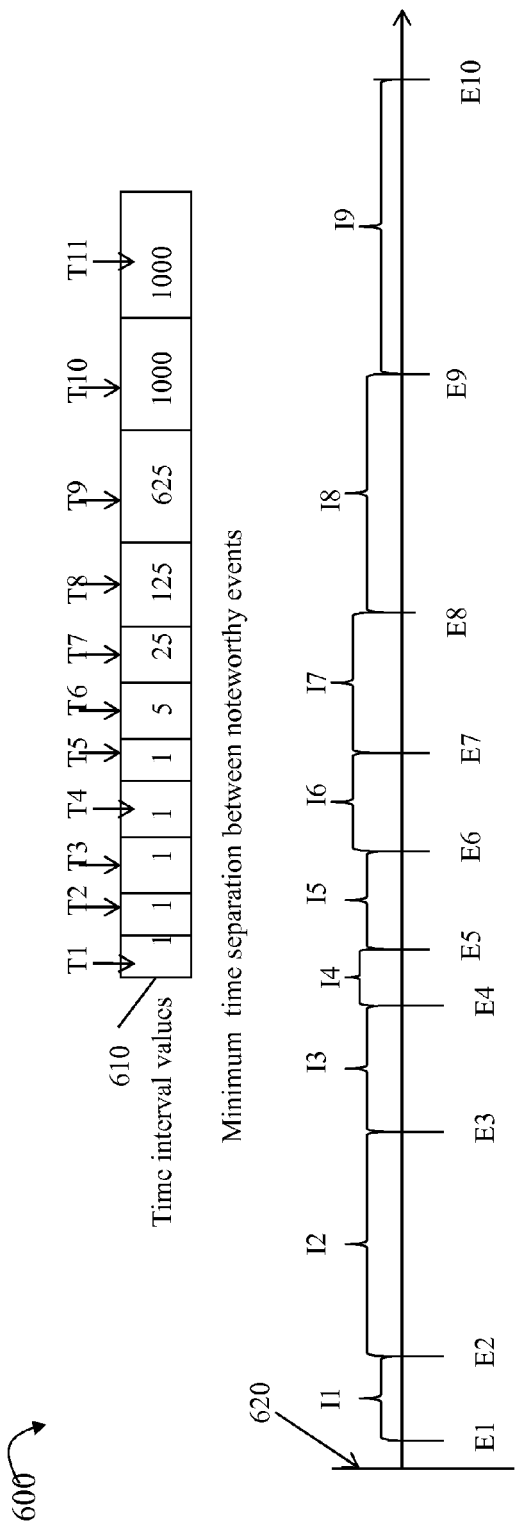

Referring to FIG. 6, shown is an example further illustrating the use of time-based noteworthy event determination. In connection with the example 600 of FIG. 6, assume an interface as described above for InitializeIncidentNoteworthiness which has been invoked at runtime specifying values of 5, 5, 5, and 1000, respectively, for the second through fifth parameters as noted above as parameters for the noteworthiness criteria. Based on this noteworthiness criteria denoted by the parameters and assuming a time unit is 1 second, element 610 may denote the time interval values, or number of time units, in each time interval as follows: T1 through T5 denote the first 5 time intervals each having a value of 1 second, T6 denotes the $6^{th}$ time interval having a value of 5 seconds, T7 denotes the $7^{th}$ time interval having a value of 25 seconds, T8 denotes the $8^{th}$ time interval having a value of 125 seconds, T9 denotes the $6^{th}$ time interval having a value of 625 seconds, and T10-11 denote, respectively, the $10^{th}$ and $11^{th}$ time intervals each having a value of 1000 seconds.

Also included in the example 600 is a timeline 620 of events E1-E10 occurring during an observed time period at various points during this time period. Each event occurs at a time relative to other events as denoted on the timeline. For example, the events E1-E10 occur in an order such that Ei<Ej means that Ei occurs in time before Ej, where 0≤i≤10 and 1≤j≤11 for the events illustrated in 620. I1-I9 may denote measure elapsed time intervals between pairs of noteworthy events. For example, I1 denotes the elapsed time between noteworthy events E1 and E2. E2 may be determined as noteworthy since E2 is the first event occurrence that is both subsequent to E1 and where the amount of time elapsed (I1) since E1 is at least T1. I2 denotes the elapsed time between noteworthy events E2 and E3. E3 may be determined as noteworthy since E3 is the first event occurrence that is both subsequent to E2 and where the amount of time elapsed (I2) since E2 is at least T2. I3 denotes the elapsed time between noteworthy events E3 and E4. E4 may be determined as noteworthy since E4 is the first event occurrence that is both subsequent to E3 and where the amount of time elapsed (I3) since E3 is at least T3. The foregoing may be generalized with respect to the example 600, for i>1 and less than 10, where an event $E_{i+1}$ may be determined as noteworthy since $E_{i+1}$ is the first event occurrence this is both subsequent to Ei and where the amount of time elapsed, Ii, since Ei is at least Ti. Once noteworthy event $E_{j+1}$ has been determined using Ti and Ii, the next subsequent time interval $T_{j+1}$ in the vector 610 of time intervals may be used to determine the next noteworthy event $E_{i+2}$. For example, when determining whether an event Ex occurring subsequent to noteworthy event E3 is also noteworthy, the amount of time that has lapsed since E3 is determined. Thus, each next noteworthy event is determined based on an amount of time that has elapsed with respect to the previous noteworthy event occurrence. So, for example, I1 (representing the amount of elapsed time between events E1 and E2) may be 2 seconds and T1 may be 1 second whereby E2 is determined as the next noteworthy event subsequent to noteworthy event E1. In this case, the next or $3^{rd}$ noteworthy event subsequent to E2 is determined with respect to an amount of elapsed time since the occurrence of E2.

Figure 7:
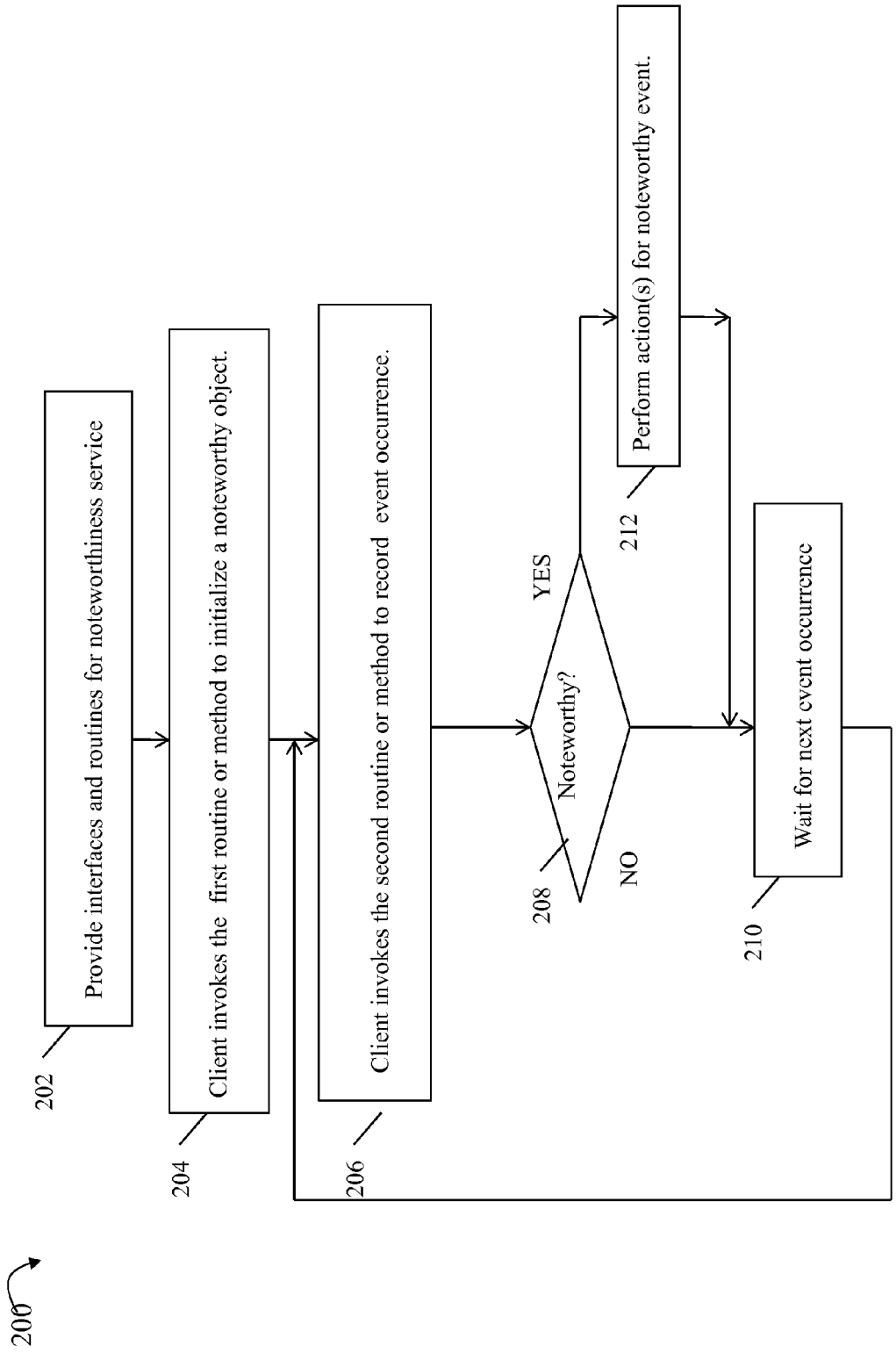
FIGS. 7 and 8 are flowcharts of processing steps that may be performed in an embodiment in accordance with techniques herein.

Referring to FIG. 7, shown is a flowchart of processing steps as may be performed in an embodiment in accordance with techniques herein. The flowchart 200 summarizes processing described above as may be performed in connection with using some routines or methods as described above and in connection with other figures. At step 202, the interfaces and routines for the noteworthiness service and associated processing may be provided. Step 202 may include providing the routines and interfaces for the first, second and third methods as described above as may be included in a library or other code module for use by client code modules. The client may be a code module which uses the noteworthiness services by invoking selected ones of the routines as needed to utilize the noteworthiness services. At step 204, a client code module may invoke the first method or routine to initialize a noteworthy object for a sequence of event occurrences. Step 204 include the client specifying necessary input parameters to the first routine identifying noteworthiness criteria. At step 206, the client may invoke the second method or routine to record an event occurrence. At step 208, the client may examine return information from the second routine to determine whether the event occurrence (as recorded in step 206) is deemed noteworthy. If step 208 evaluates to yes, control proceeds to step 212 where the client may perform a suitable action for the noteworthy event occurrence. Control then proceeds to step 210 to wait for the next event occurrence to be recorded. Responsive to this next event occurrence, control proceeds to step 206. If step 208 evaluates to no, control proceeds to 210.

Figure 8:
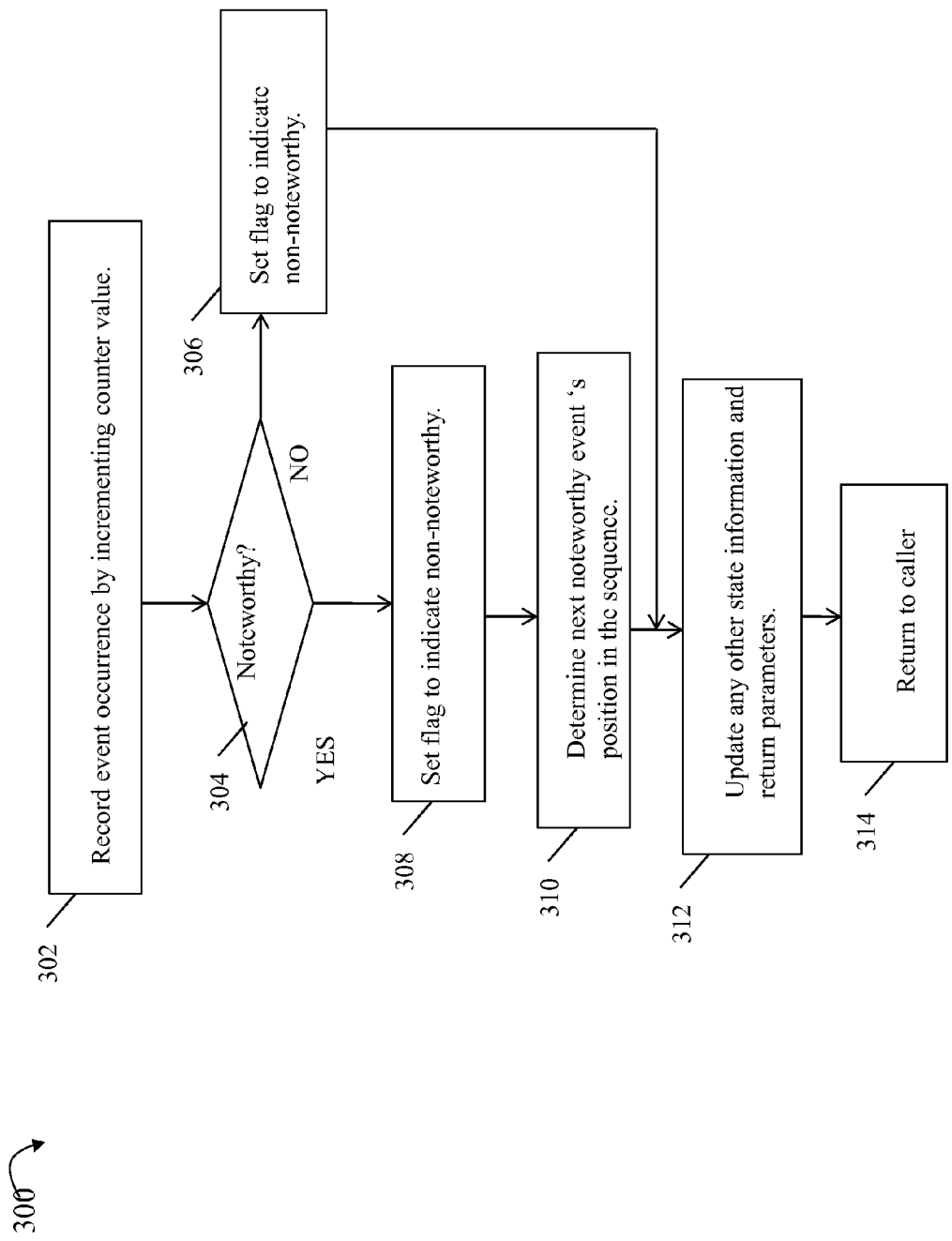

Referring to FIG. 8, shown are processing steps as may be performed by the second routine described herein for recording an event occurrence in an embodiment in accordance with techniques herein. The flowchart 300 includes steps as may be performed by the second routine when invoked by a client to record an event occurrence in connection with an embodiment performing frequency or iterative based noteworthy determination (e.g. see FIG. 4A). At step 302, the counter value such as associated with the object for the sequence of event occurrences may be incremented by 1 to denote the recording of the event occurrence. At step 304, a determination is made as to whether the recorded event occurrence is noteworthy. As described herein, step 304 may include comparing the current counter value to another index value denoting the position in the sequence of the next noteworthy event. If the foregoing two values are equal, then the event occurrence is noteworthy and otherwise, the current event occurrence may be deemed non-noteworthy. If step 304 evaluates to no, control proceeds to step 306 to set a return flag indicating that the recorded event occurrence is non-noteworthy. Control then proceeds to 312 described below. If step 304 evaluates to yes, control proceeds to step 308 to set the return flag indicating that the recorded event occurrence is noteworthy. At step 310, processing may be performed to determine the next noteworthy event occurrence in the sequence. This may be performed using the noteworthiness criteria as specified in a prior call to the initialization routine, the first routine described herein, and the counter value. For example, reference is made back to FIG. 4B. The counter value is examined to determine the position or index in the sequence corresponding to the next noteworthy event. For example, if the counter value is 4, then the position in the sequence of the next noteworthy event is 5 in connection with P2 (second parameter) having a value of 5. If the counter is currently 5, then the position in the sequence of the next noteworthy event is 10 in connection with P3 (third parameter) having a value of 10. If the counter is currently 10, then the position in the sequence of the next noteworthy event is 50 in connection with P4 (fourth parameter) specifying a growth or multiplicative factor of 5. At this point, the position of the next noteworthy event may be calculated as the product of P4 (which is 5) multiplied by the current counter value (which is 10) to obtain 50. Similarly, subsequent positions for subsequent noteworthy events may be determined until the position reaches the maximum positional value denoted by P5 (parameter 5) which is 1000. From here, the position of next noteworthy events may be determined as a next multiple of the maximum value specified by P5. (e.g. increases by 1000 for each subsequent noteworthy event).

From step 310, control proceeds to step 312 to update any other state information and return parameters as described herein that may be included in a particular embodiment. At step 314, control returns to the caller.

As described above, the second routine may also perform processing to record an event occurrence in an embodiment which uses time-based criteria such as in connection with FIGS. 5 and 6 so that at least a minimum amount of time has elapsed between successive or consecutive noteworthy events. Such processing is similar to that as illustrated in FIG. 8 with the difference that step 310 is not performed and processing uses the time-based criteria rather than the iterative or frequency-based criteria. Rather perform step 310 in this case, processing may be performed to determine a next updated value for the minimum amount of time. As described herein, the interval representing the amount of time that elapses between consecutive noteworthy events is adjusted or increased each time a recorded event is determined to be a noteworthy event. In this manner, the revised or adjusted time interval may reflect the minimum amount of time that must now elapse until the next recorded event occurrence is considered noteworthy. Such time interval may increase with each such adjustment in a manner as set forth in accordance with the noteworthiness criteria. For example, the time interval may increase with each such adjustment so that the noteworthiness determination for the sequence tapers off in a logarithmic manner.

It should be noted that for simplicity only a single sequence of events is described for use by a single client. However, a single client may have multiple such sequences such as for multiple logical devices in connection with the example described herein for determining which event occurrences of "device busy" statuses are noteworthy. Additionally, a single sequence of events may be associated with repetitive event occurrences of the same event as described herein. However, the same single sequence may also be associated with event occurrences for more than one particular type of event occurrence.

An embodiment may implement the techniques herein using code executed by a processor. For example, an embodiment may implement the techniques herein using code which is executed by a processor of the data storage system, management system, or more generally, any computer system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining noteworthy events comprising:
    performing, by a client, a first call to a first routine having a first interface, said first interface including a first set of one or more input parameters specifying noteworthiness criteria indicating which event occurrences in a sequence of event occurrences are noteworthy, said first routine initializing state information for the sequence of event occurrences, said state information including a counter denoting a number of recorded event occurrences in the sequence at a current point in time, said noteworthiness criteria identifying a plurality of positions in the sequence corresponding to event occurrences in the sequence which are noteworthy, said plurality of positions including at least one position determined by multiplying a growth factor by a value denoting a positional distance in the sequence;
    responsive to an event occurrence, performing, by the client, a second call to a second routine having a second interface to record the event occurrence of the sequence, said second routine performing first processing for said event occurrence including:
        updating the state information for the sequence by incrementing the counter thereby recording that said event occurrence;
        determining, using said noteworthiness criteria, whether said event occurrence is noteworthy; and
        returning information to the client including an indicator value denoting whether said event occurrence is noteworthy; and
    determining, by the client in response to receiving said indicator value for said event occurrence, whether said indicator value indicates that said event occurrence is noteworthy and wherein said client performs an action if said indicator value indicates that said event occurrence is noteworthy.

2. The method of claim 1, wherein said client performs a plurality of calls to said second routine to record a plurality of event occurrences for the sequence, each of said plurality of calls resulting in said second routine recording one of said plurality of event occurrences in the sequence and returning an indicator value to the client indicating whether said one event occurrence just recorded is noteworthy in accordance with said noteworthiness criteria.

3. The method of claim 2, further comprising:
    performing, by the client, a third call to a third routine to reset the counter of the sequence to zero.

4. The method of claim 3, wherein each call to said second routine to record an event occurrence of the sequence returns a current value of the counter denoting a position of the event occurrence recorded by said each call in the sequence.

5. The method of claim 1, wherein each event occurrence in said sequence has a position in said sequence indicating when said each event occurrence is recorded relative to recording other event occurrences in the sequence.

6. The method of claim 5, wherein said noteworthiness criteria includes a first parameter indicating a quantity of initial noteworthy events in the sequence and a second parameter indicating an initial noteworthiness goal, said second parameter denoting an initial interval value used to identify a first position in the sequence subsequent to said initial noteworthy events whereby the first position denotes a next noteworthy event in the sequence following said initial noteworthy events.

7. The method of claim 6, wherein said noteworthiness criteria includes a third parameter identifying the growth factor denoting a multiplicative amount by which an interval denoting a next noteworthy event occurrence increases when said counter is updated to a value that identifies a position in said sequence that is greater than or equal to the first position and that corresponds to an event occurrence of the sequence that is noteworthy.

8. The method of claim 7, wherein said noteworthiness criteria includes a fourth parameter identifying a maximum value for the interval.

9. The method of claim 8, wherein the interval has a first value denoting a first positional distance in the sequence of a first noteworthy event occurrence and wherein second processing is performed to record a first event occurrence of the sequence, said second processing comprising:
    updating the counter to a first counter value denoting a position in the sequence for the first event occurrence;
    determining whether the counter is equal to the interval; and
    determining that the first event occurrence is the first noteworthy event occurrence if the counter is equal to the interval.

10. The method of claim 1, wherein said second call to said second routine returns a count indicating a number of additional non-noteworthy event occurrences that have to be recorded prior to determining a next noteworthy event occurrence in the sequence.

11. The method of claim 1, wherein the first call to the first routine and the second call to the second routine each identify an object as a parameter, wherein said object includes said state information for the sequence, and wherein the first routine and the second routine are methods of the object.

12. The method of claim 1, wherein the noteworthiness criteria includes iterative count-based intervals whereby a next noteworthy event is determined based on a minimum number of event occurrences between the next noteworthy event in the sequence and the previous noteworthy event in the sequence.

13. The method of claim 12, wherein the noteworthiness criteria specifies that a number of non-noteworthy events between successive noteworthy events increases by a multiplicative factor.

14. The method of claim 1, wherein the noteworthiness criteria includes time-based intervals whereby a next noteworthy event is determined based on a minimum amount of time having elapsed between the next noteworthy event in the sequence and the previous noteworthy event in the sequence.

15. A method for determining noteworthy events comprising:
  performing, by a client, a first call to a first routine having a first interface, said first interface including a first set of one or more input parameters specifying noteworthiness criteria indicating which event occurrences in a sequence of event occurrences are noteworthy, said first routine initializing state information for the sequence of event occurrences, said state information including a counter denoting a number of recorded event occurrences in the sequence at a current point in time;
  performing, by the client, a second call to a second routine having a second interface to record an event occurrence of the sequence, said second routine performing first processing for said event occurrence including:
    updating the state information for the sequence by incrementing the counter thereby recording that said event occurrence;
    determining, using said noteworthiness criteria, whether said event occurrence is noteworthy; and
    returning information to the client including an indicator value denoting whether said event occurrence is noteworthy; and
  determining, by the client in response to receiving said indicator value for said event occurrence, whether said indicator value indicates that said event occurrence is noteworthy and wherein said client performs an action if said indicator value indicates that said event occurrence is noteworthy, wherein each event occurrence in said sequence has a position in said sequence indicating when said each event occurrence is recorded relative to recording other event occurrences in the sequence, and wherein said noteworthiness criteria specifies a plurality of positions in the sequence corresponding to event occurrences in said sequence which are noteworthy, wherein said noteworthiness criteria includes a first parameter indicating a quantity of initial noteworthy events in the sequence and a second parameter indicating an initial noteworthiness goal, said second parameter denoting an initial interval value used to identify a first position in the sequence subsequent to said initial noteworthy events whereby the first position denotes a next noteworthy event in the sequence following said initial noteworthy events, wherein said noteworthiness criteria includes a third parameter identifying a growth factor denoting a multiplicative amount by which an interval denoting a next noteworthy event occurrence increases when said counter is updated to a value that identifies a position in said sequence that is greater than or equal to the first position and that corresponds to an event occurrence of the sequence that is noteworthy, wherein said noteworthiness criteria includes a fourth parameter identifying a maximum value for the interval, wherein the interval has a first value denoting a first positional distance in the sequence of a first noteworthy event occurrence and wherein second processing is performed to record a first event occurrence of the sequence, said second processing comprising:
  updating the counter to a first counter value denoting a position in the sequence for the first event occurrence;
  determining whether the counter is equal to the interval; and
  determining that the first event occurrence is the first noteworthy event occurrence if the counter is equal to the interval, and wherein if said first event occurrence is identified as the first noteworthy event occurrence in the sequence, performing third processing including:
    determining a second value by multiplying the first value by the growth factor;
    determining whether the second value is greater than said maximum value; and
    updating the interval to the second value denoting a second positional distance in the sequence of a second noteworthy event occurrence subsequent in the sequence to said first noteworthy event if said second value is not greater than said maximum value, and otherwise, if said second value is greater than said maximum value, updating the interval to the maximum value.

16. The method of claim 15, wherein a third noteworthy event occurrence in the sequence subsequent to the second noteworthy event occurrence has a third positional distance in the sequence that is a multiple of said maximum value and wherein an event occurrence being recorded is determined as the third noteworthy event if the counter denoting the event occurrence being recorded is equal to the third positional distance.

17. A non-transitory computer readable medium comprising code stored thereon for determining noteworthy events, the non-transitory computer readable medium comprising code that, when executed by a processor, performs a method comprising:
  performing, by a client, a first call to a first routine having a first interface, said first interface including a first set of one or more input parameters specifying noteworthiness criteria indicating which event occurrences in a sequence of event occurrences are noteworthy, said first routine initializing state information for the sequence of event occurrences, said state information including a counter denoting a number of recorded event occurrences in the sequence at a current point in time, said noteworthiness criteria identifying a plurality of positions in the sequence corresponding to event occurrences in the sequence which are noteworthy, said plurality of positions including at least one position determined by multiplying a growth factor by a value denoting a positional distance in the sequence;
  responsive to an event occurrence, performing, by the client, a second call to a second routine having a second interface to record the event occurrence of the sequence, said second routine performing first processing for said event occurrence including:
- updating the state information for the sequence by incrementing the counter thereby recording that said event occurrence;
- determining, using said noteworthiness criteria, whether said event occurrence is noteworthy; and
- returning information to the client including an indicator value denoting whether said event occurrence is noteworthy; and determining, by the client in response to receiving said indicator value for said event occurrence, whether said indicator value indicates that said event occurrence is noteworthy and wherein said client performs an action if said indicator value indicates that said event occurrence is noteworthy.

18. The non-transitory computer readable medium of claim 17, wherein said client performs a plurality of calls to said second routine to record a plurality of event occurrences for the sequence, each of said plurality of calls resulting in said second routine recording one of said plurality of event occurrences in the sequence and returning an indicator value to the client indicating whether said one event occurrence just recorded is noteworthy in accordance with said noteworthiness criteria.

19. The non-transitory computer readable medium of claim 17, wherein each event occurrence in said sequence has a position in said sequence indicating when said each event occurrence is recorded relative to recording other event occurrences in the sequence.

20. The non-transitory computer readable medium of claim 19, wherein said noteworthiness criteria includes a first parameter indicating a quantity of initial noteworthy events in the sequence and a second parameter indicating an initial noteworthiness goal, said second parameter denoting an initial interval value used to identify a first position in the sequence subsequent to said initial noteworthy events whereby the first position denotes a next noteworthy event in the sequence following said initial noteworthy events.

* * * * *